July 21, 1936.  W. KUHLMAN ET AL  2,048,394
CARD VERIFYING MACHINE
Filed Feb. 21, 1934    10 Sheets-Sheet 1

INVENTORS
William Kuhlman
Paul Becker
BY
Robert H. Strother
ATTORNEY

July 21, 1936.   W. KUHLMAN ET AL   2,048,394
CARD VERIFYING MACHINE
Filed Feb. 21, 1934     10 Sheets-Sheet 2
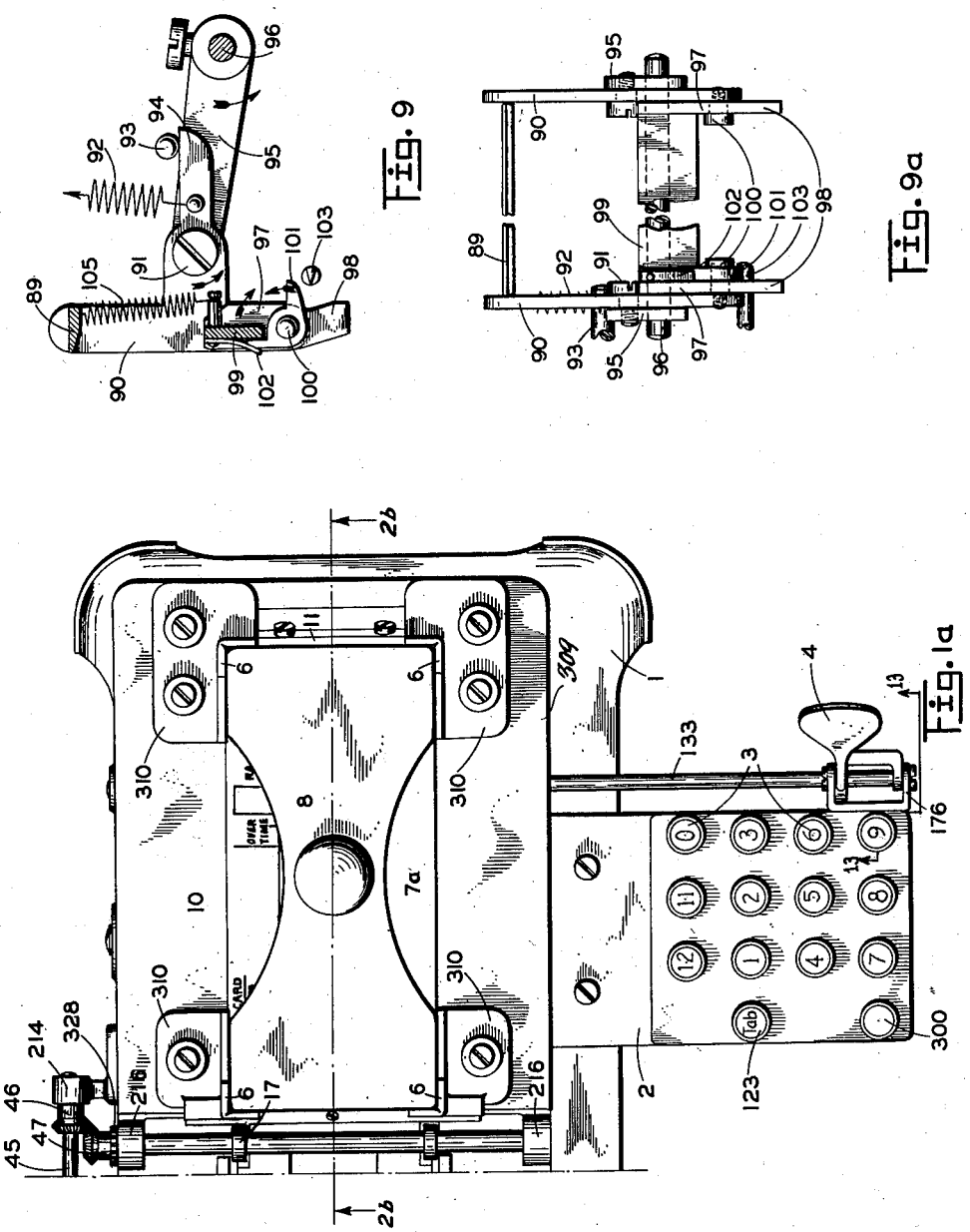
WITNESS
INVENTORS
William Kuhlman
Paul Becker
BY
Robert H. Strother
ATTORNEY July 21, 1936.  W. KUHLMAN ET AL  2,048,394
CARD VERIFYING MACHINE
Filed Feb. 21, 1934  10 Sheets-Sheet 3

INVENTORS
William Kuhlman
Paul Becker
BY
Robert H. Strother
ATTORNEY

WITNESS

July 21, 1936.  W. KUHLMAN ET AL  2,048,394
CARD VERIFYING MACHINE
Filed Feb. 21, 1934  10 Sheets-Sheet 4
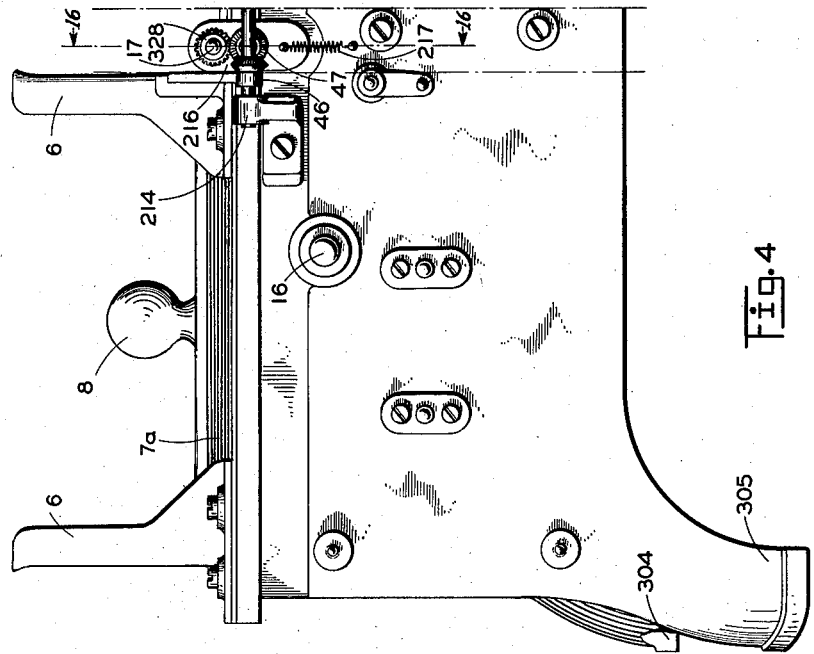
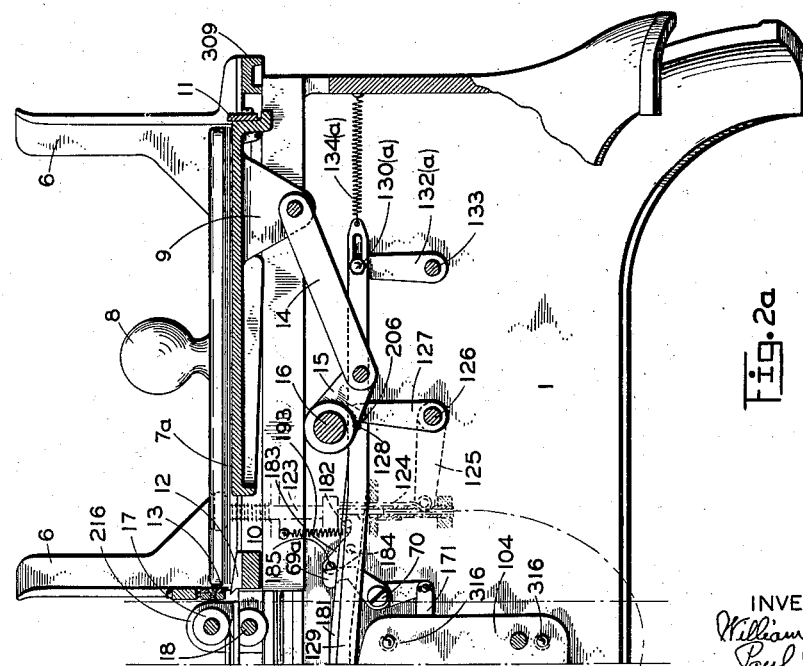
WITNESS
INVENTORS
William Kuhlman
Paul Becker
BY Robert H. Strother
ATTORNEY

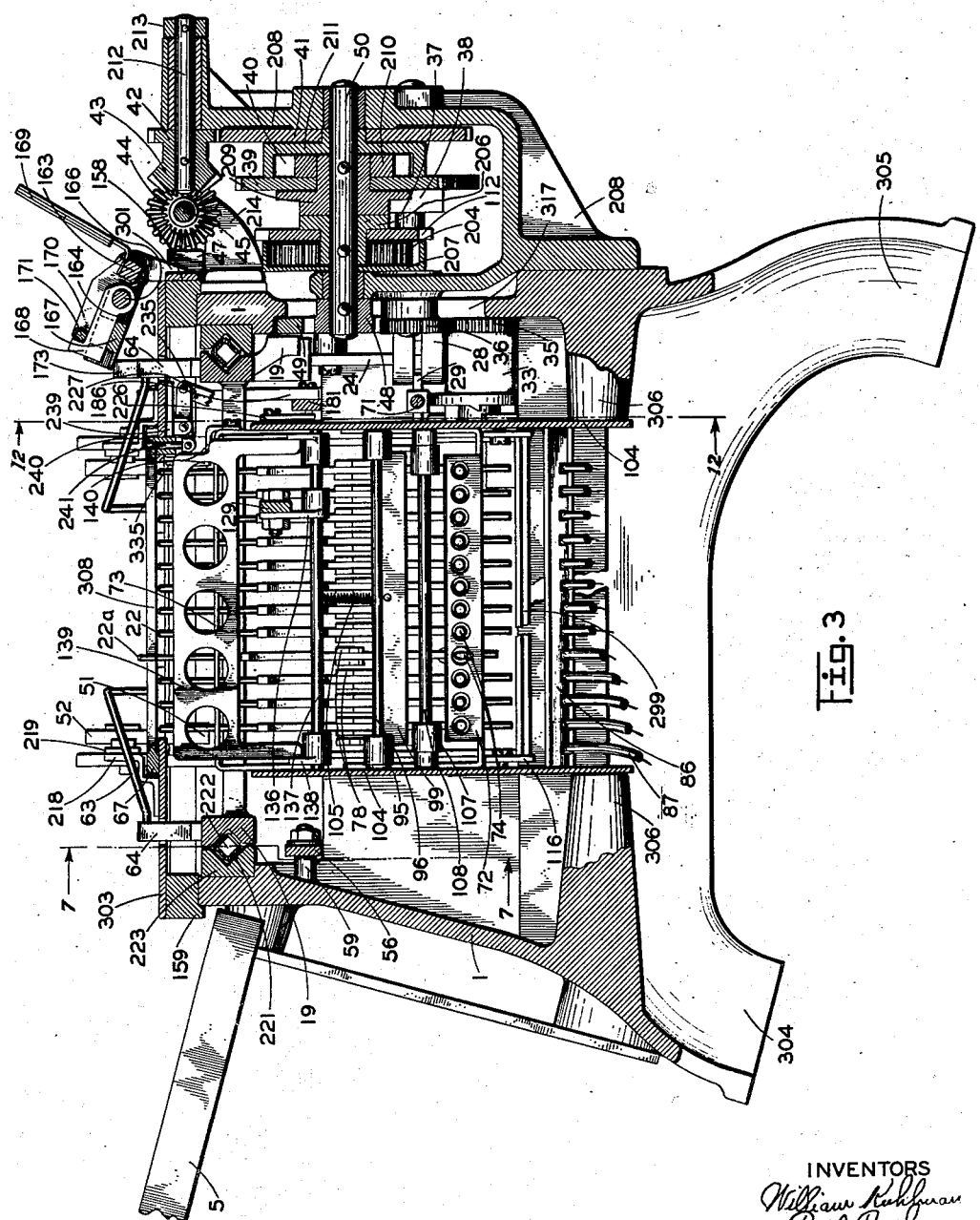

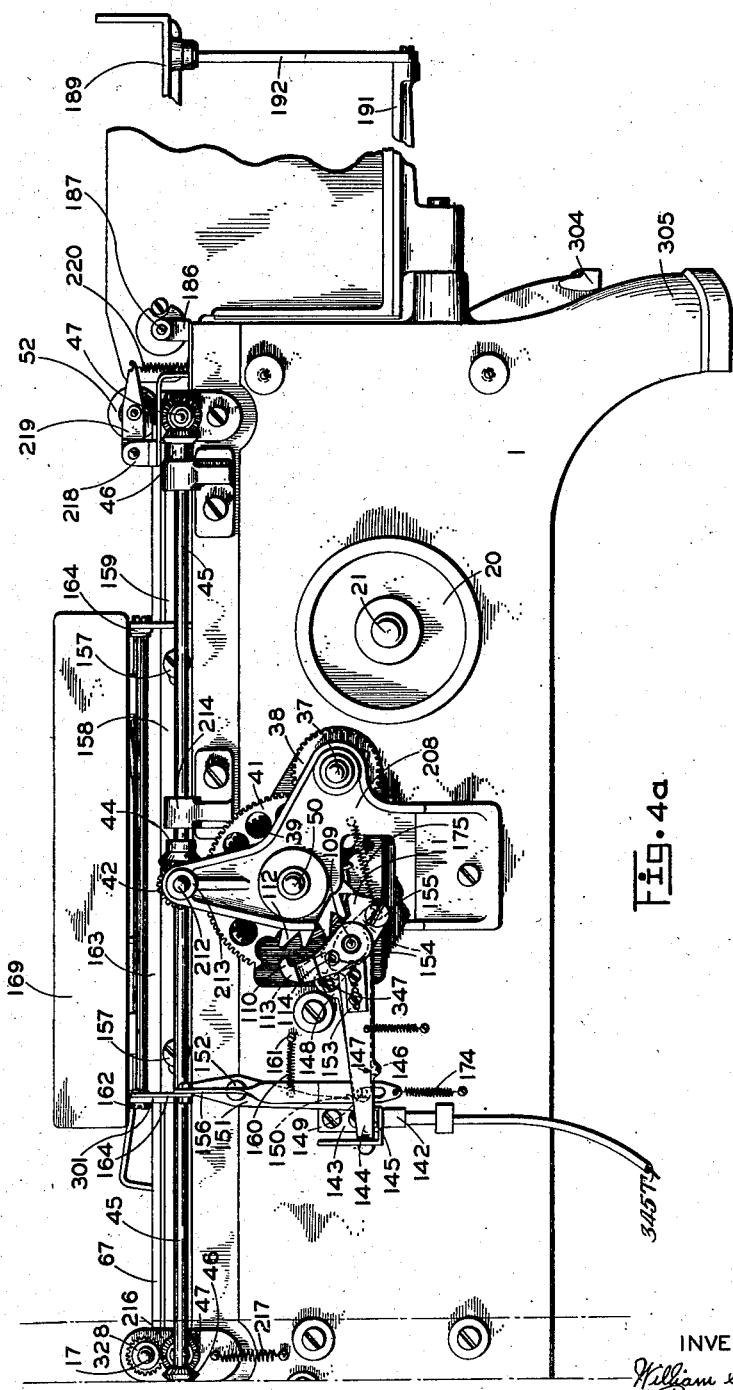

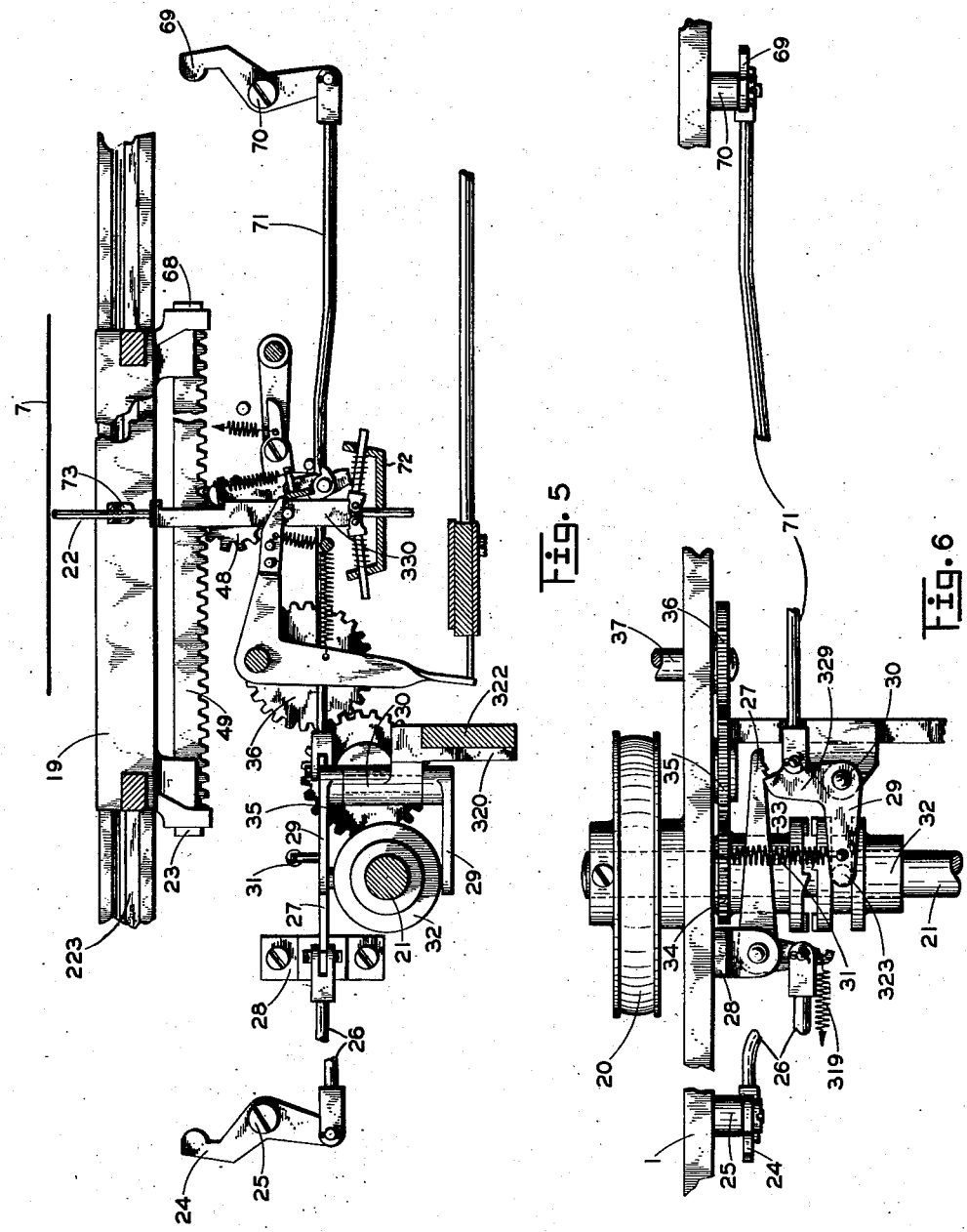

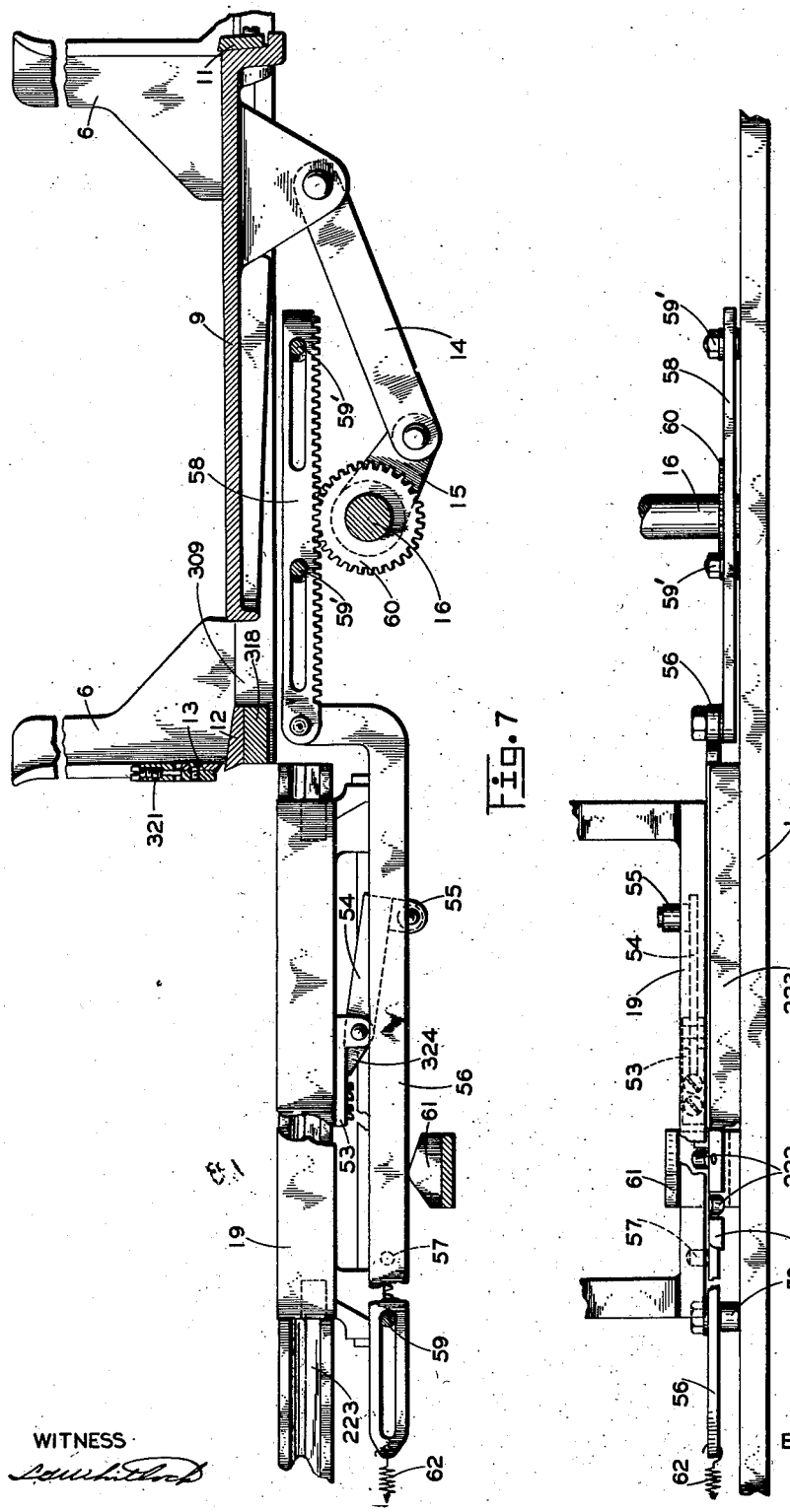

July 21, 1936.                W. KUHLMAN ET AL                2,048,394
                              CARD VERIFYING MACHINE
                         Filed Feb. 21, 1934        10 Sheets-Sheet 9

WITNESS

INVENTORS
William Kuhlman
Paul Becker
BY
Robert H. Strother
ATTORNEY

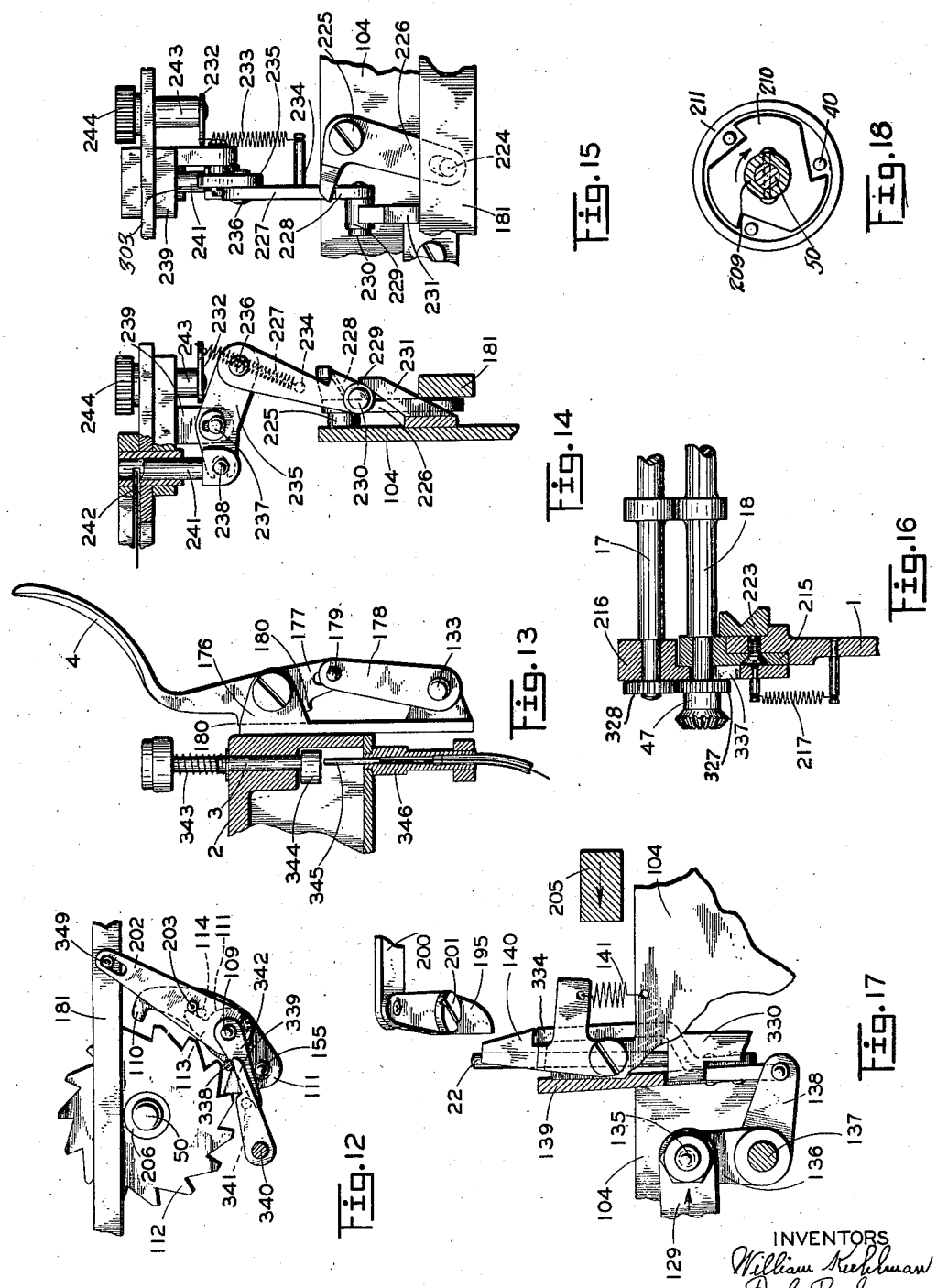

Patented July 21, 1936

2,048,394

UNITED STATES PATENT OFFICE 2,048,394

CARD VERIFYING MACHINE

William Kuhlman, Berlin-Wilmersdorf, and Paul Becker, Berlin, Germany, assignors to Remington Rand Inc., Buffalo, N. Y., a corporation of Delaware Application February 21, 1934, Serial No. 712,300
In Germany February 25, 1933

5 Claims. (Cl. 73—51)

This invention relates to punched card verifying machines for testing the correctness with which statistical cards have been perforated. The machine is of that type in which a perforated card is checked column by column by a set of keys. The machine includes a step by step carriage and is so constructed that the carriage escapement will not be operated unless the key or keys depressed correspond to the perforation or perforations in the particular column being checked at the moment.

The invention has for its object to provide several improvements in machines of the type indicated.

The cards are fed from a stack into a card carriage which moves step by step across a set of feeler pins, the appropriate keys being operated at each column position. When the carriage reaches the end of its travel the step of the carriage following the last key struck, brings into operation mechanism which automatically ejects the card, restores the carriage, and feeds another card to the carriage. This automatic operation improves the speed and convenience of the machine, and also has the effect that without it the operator might fail to observe that the very last step of the carriage had not occurred and might eject a card as being correct which as a matter of fact was not correctly punched in the last one or two or three columns.

The means whereby the carriage escapement is operated by the key includes a coupling member, which is normally out of operating position and which is automatically moved into operating position on the key depression in case the key or keys operated correspond to the feeler pins that have found holes in the card. If any key is depressed that does not correspond to a hole the carriage will not feed, and unless every key is operated that does correspond to a hole, the carriage will not feed.

The cards sometimes have printed on them numerals corresponding to the perforations, and it is therefore desirable that the cards be visible while they are being verified. To this end all of the checking mechanism is mounted underneath the card, so that the latter is freely visible to the operator.

It is desirable that the pressure of the feeler pins against the under side of the card be light so as not to injure the card nor to interfere with its travel, but that the force with which the pin is projected upward be sufficient for its purpose. The spring pressure on the feelers is, therefore, applied by toggle mechanism, which has the effect that when a pin is pressed against the under surface of the card the pressure is light, but as the pin moves upward the effective component of the spring pressure increases. Moreover, just before moving the carriage the pins are drawn down past the dead centers of the springs, so that the latter temporarily act to hold the pins down away from the cards.

When it is discovered that a card has been erroneously punched, and an error key is operated, it causes the card to be ejected and a new card to be fed into position. This error key also marks the column on the card in which the error was detected. It also throws a shutter, so that the card when ejected will be placed in a pile separate from that of the correctly punched cards. The marking device, which may consist of a punch for cutting a notch in the edge of the card, can be made operative or inoperative at will.

The machine is also provided with a tabulator key and adjustable stops, so that any columns which do not require verification may be skipped.

The invention also includes other features which will appear in the course of the description.

The invention consists in certain features of construction and combinations and arrangements of parts, all of which will be fully described herein, and particularly pointed out in the claims.

In the drawings—

Figs. 1 and 1a together constitute a general view of the machine from above.

Figs. 2 and 2a together constitute a longitudinal section on line 2a—2a of Fig. 1.

Fig. 3 is a cross section on line 3—3 of Fig. 1.

Figs. 4 and 4a together constitute a general view from the rear.

Fig. 5 is a fragmentary view in transverse vertical section, looking toward the rear.

Fig. 6 is a plan view showing some of the power mechanism for returning the carriage, etc.

Fig. 7 is a section on the line 7—7 of Fig. 3, showing some of the card feeding mechanism.

Fig. 8 is a partial view of the same from above.

Fig. 9 is a front sectional view of a portion of the verifying mechanism.

Fig. 9a is a right side elevation of Fig. 9.

Fig. 12 is a partial section on the line 12—12 of Fig. 3, to show details of the carriage escapement.

Fig. 13 is a section through the keyboard on the line 13—13 of Fig. 1a.

Fig. 14 is a view similar to Fig. 3 of the error-sign-punching contrivance.

Fig. 15 is a rear view of Fig. 14.

Fig. 16 is a detail in section on the line 16—16 of Fig. 4 showing the feed roller bearings.

Fig. 17 is a fragmentary rear view.

Fig. 18 is a section through the carriage return clutch.

Figs. 1, 1a, 2, 2a and 4 are on a smaller scale than the other drawings.

*General description of the machine*

Figure 1:
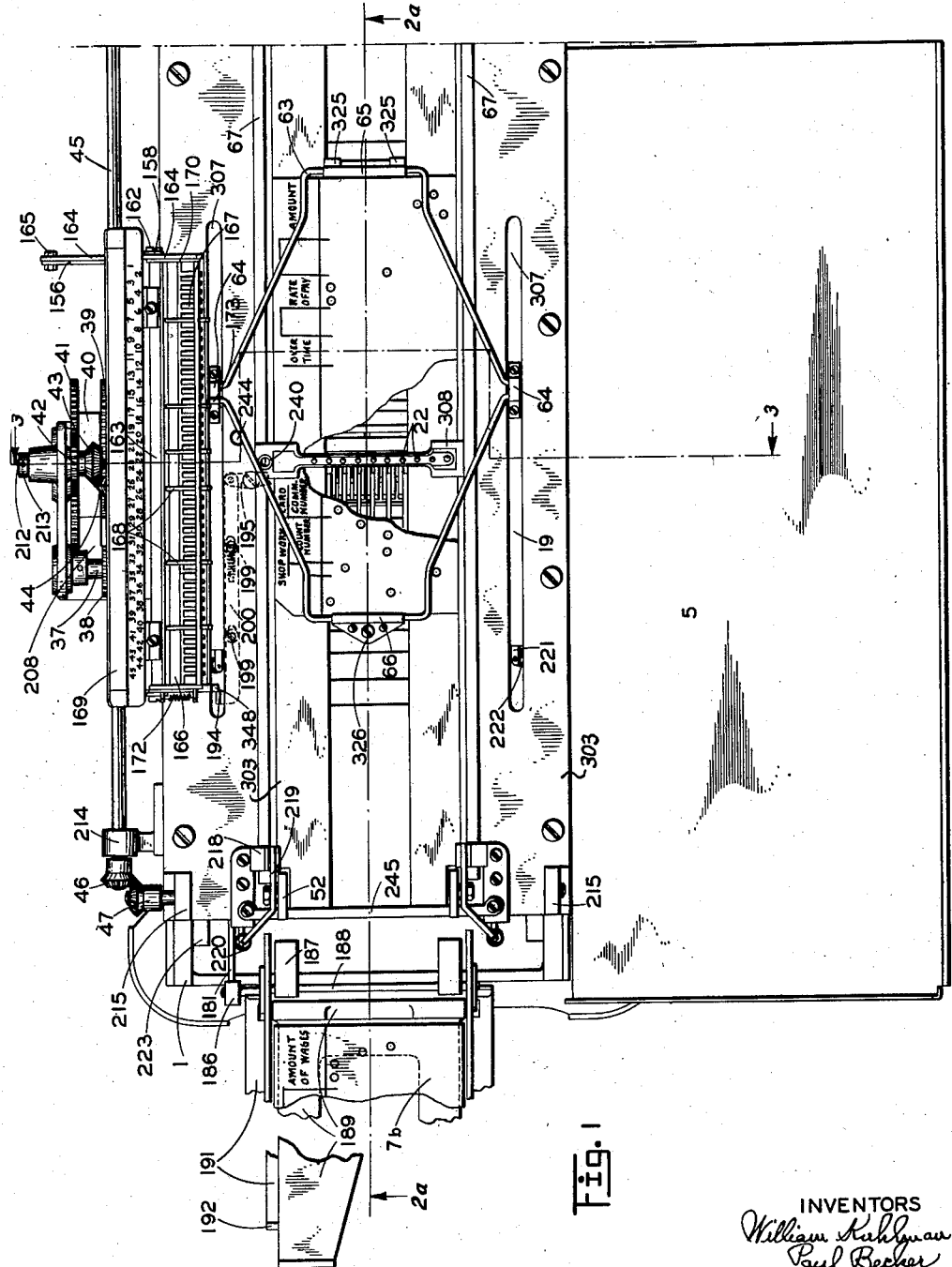

As shown in Figs. 1–4a, the frame of the machine is a casting. The two front legs 304 are made shorter than the hind legs 305, and the feet are so beveled that when set on the horizontal top of a table, the machine stands in a forwardly inclined position, so that the card being verified is more readily visible. In the drawings, however, the machine is shown as if its top were horizontal.

A bar or rail 159 is secured to the upper edge of each of the longitudinal walls of the frame, and on each bar lies a deck-plate 303, as shown in section in Fig. 3. Each deck-plate 303 carries a guide bar 67 for the top and bottom edges of the cards. The two guides 67 (Fig. 1) are so cut out on the under side that they, together with the deck-plates 303, form guide grooves for the edges of the card. Each of the deck-plates 303 is made with a longitudinal slot 307 through which a bearing block 64 projects upward from a carriage which is guided in the framework and moves step-by-step under key control, as will be explained hereinafter. The bearing blocks 64 have pivoted thereto two wire bails 63, whose shape is shown in Fig. 1, and on which respectively are secured card-grippers 65 and 66. The bails 63 rest by gravity on the deck-plates 303, so that the grippers 65 and 66 engage the short end edges of the card (Fig. 2) and carry it along step by step with the carriage from right to left. The card is thus slid along over the deck-plates 303 between the guide bars 67. The two bars 67 support between them a bridge piece 308 which lies just above the card and has a longitudinal slot through which the feeler pins may come up from beneath, the bar serving to hold the card against the upward pressure of the pins.

The bars 159 and deck-plates 303 are shorter than the frame of the machine and terminate at the right at the card magazine which is mounted on the frame. This is supported by a horse-shoe shaped frame piece 309, which rests on and is screwed to the upper edges of the side plates 1. The magazine consists of four upright angle bars 6, whose feet 310 are screwed to the frame 309 and which embrace the corners of the stack of cards. On the stack of cards is the usual weight 8, to insure the proper action of the to-and-fro moving picker 9 in feeding the cards to the first feed rolls 17, 18, which in turn, feed them to the grippers 65, 66, carried by the bails 63, by which grippers the cards are fed along with the carriage.

Between the arms of the horse-shoe shaped frame 309, extends a bar 318 (Fig. 7) on which a hump 12 is mounted. This, together with a plate 13 which is adjustably carried by a cross-bar 321 joining the two left-hand angle posts 6, forms an outlet throat of a width suitable to the thickness of the cards. The picker 9, which is guided for horizontal sliding, carries at its hind end the usual picker knife 11, so that by the left-ward motion of the slide the bottom card of the stack is fed out through the outlet between the hump 12 and the plate 13 to the pair of rollers 17, 18.

When the verifying of the card is completed, it will pass, as will be explained hereinafter, in reach of other feed rolls 51, 52, which will feed it to a receptacle, which is supported by the left-hand wall of the machine frame. Its base plate 191 (Fig. 2) has perforated lugs 311, which can be pushed over studs 312 which project from bosses 313 of the end wall of the frame 1. The base plate 191 has secured thereto two side-walls 314 and an end wall 192. The side walls extend upward and forward to near the feed rolls 51, 52, in order to guide the cards expelled by the latter. Between the side walls 314 and on a level with the deck-plates 303, a horizontal plate 189 is pivoted on which the defective cards are deposited. This cover plate rests on the end wall 192 and can be tilted up about an axis 190 pivoted in the side walls, in order to give access to the receptacle beneath it, a handle 315 being provided for the purpose.

In the middle part of the machine are arranged two upright parallel frame plates 104, between which the verifying mechanism proper is mounted, said plates being secured by screws 316 (Fig. 2) to bosses 306 (Fig. 3) projecting inward from the side walls 1. The front wall also carries at the right the keyboard designated as a whole by the numeral 2 (Fig. 1a) and at the left thereof a table 5 on which the cards and the sheets by reference to which they are to be verified, may be laid and arranged.

The rear wall 1 is, about in the middle of the frame, made with a cut-out 317 (Fig. 3) which is covered by a housing 208, secured to the frame by screws. This housing encloses and supports mechanism for imparting a step-by-step feed to the carriage and for restoring the carriage automatically to its initial position.

Inside the frame at the right (Fig. 2a) is the driving mechanism for the picker 9 and at the left the coupling for the automatic carriage return mechanism.

*The card carriage*

The longitudinal walls 1 of the frame support along their upper edges parallel stationary carriage rails 223 which reach from the card magazine up to the left wall of the frame (Fig. 2), each having a longitudinal groove constituting the runway for the bearing rollers 222.

Figure 2:
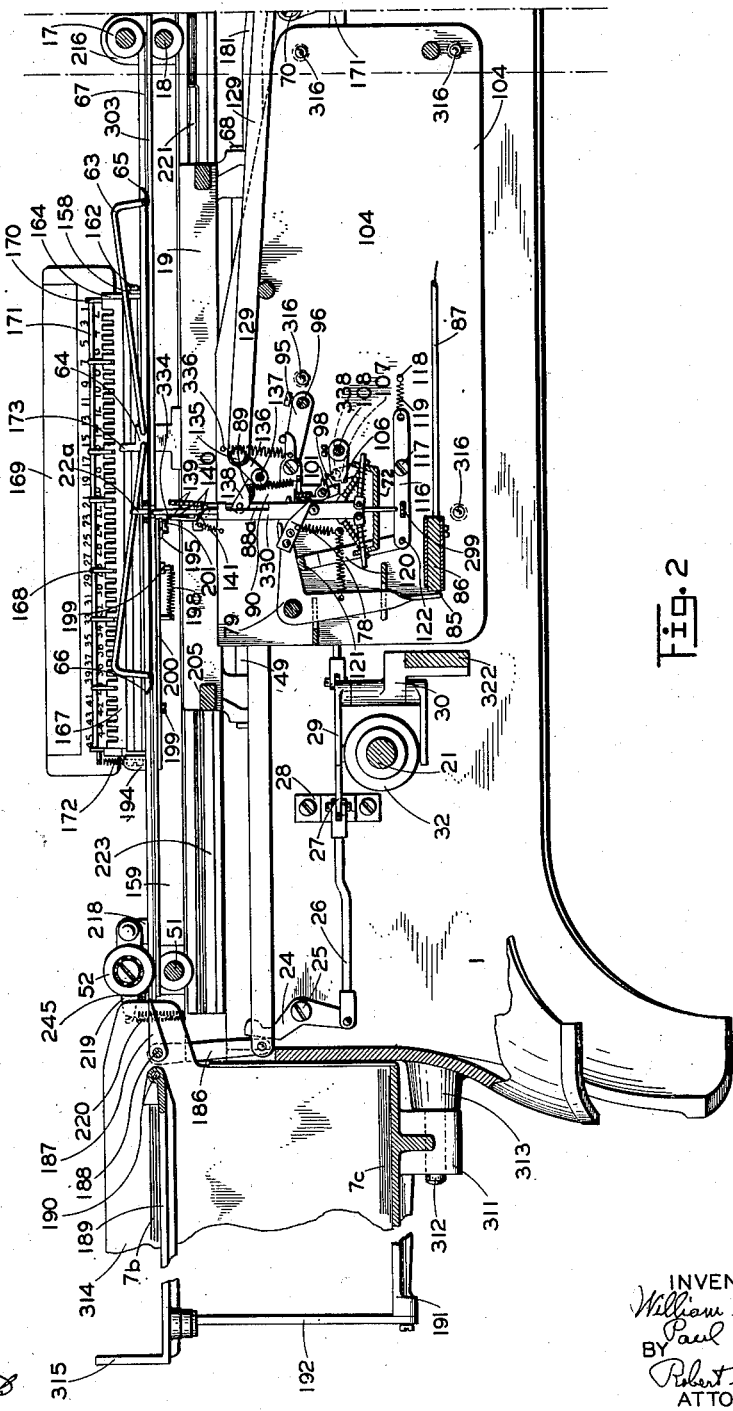

The carriage itself consists of a frame whose longitudinal members 19 have grooved runways for the rollers 222 and at their ends are connected by crossbars 205 (Figs. 2 and 8). These longitudinal bars carry the above mentioned blocks 64. The rear bar has at its right and left ends depending bosses which carry a rack bar 49 lying parallel to the carriage travel and also abutments 23 and 68 whose purpose will be explained later. The length of the carriage is such that its travel will not be interfered with by the feeling devices which are situated between the cross bars 205.

The bearing rollers 222 are journaled in the usual holder 221 whose right hand end, as shown in Fig. 2 is somewhat bent so that it strikes against the end wall of the carriage rail to keep it from getting out of position.

*Carriage return mechanism*

When the carriage has completed its step-by-step motion from right to left due to the operation of the keys, the card which has been carried with it by the bails 63 will be automatically discharged and the carriage automatically returned to its initial position and there supplied with a new card. The necessary power for this is derived from a pulley 20 (Fig. 6) driven by an electric motor, which pulley is mounted on the end of a shaft 21 journaled in the longitudinal walls 1 and projecting behind the rear wall. The shaft 21 has slidably splined thereon a toothed clutch member 32. The other clutch member 33, which is situated between the rear wall and the clutch member 32, is freely rotatable on the shaft, is secured against axial displacement, and carries a pinion 34 which through a train of gearing is in continuous operative connection with the rack bar 49 fast on the carriage. When the clutch 32, 33 is closed the carriage is moved toward the right in Fig. 2 to its starting position.

The opening and closing of the clutch is controlled as follows: Inside the rear wall 1 of the frame on a horizontal pivot 25 (Figs. 5 and 6) a vertical two-armed lever 24 is pivoted whose upper arm lies in the path of an abutment 23 on the carriage, and whose lower arm, by a link 26, is connected with a bell crank 27 pivoted in a bearing piece 28 secured to the back wall 1 and in such fashion that it can swing on a vertical pivot. Its free arm tends, under the force of a spring 319, to press against an arm 329 which is mounted on a vertical shaft 30 which is journaled in a bearing piece 320 mounted on a cross bar 322 of the frame. The shaft 30 carries two arms 29 one above and the other below the clutch member 32 and which by pins 323 engage in a peripheral groove in said clutch member, so as to open and close the clutch. A spring 31 secured at one end to the frame and at the other to the upper arm 29, tends to swing the arms 329 clockwise but is normally prevented from doing so by hook teeth on the bell crank 27 latching the arm 329. When, however, the carriage strikes the lever 24 the bell crank 27 is rocked and frees the clutch member so that the clutch closes and the power connection between the continuously rotating pulley 20 and the carriage is established. When the carriage reaches its right-hand or initial position an abutment 68 thereon strikes a vertical two-armed lever 69 pivoted on a horizontal pin 70 to the inner face of the rear wall 1 and whose lower arm is connected by a link 71 with the arm 329. Thereby the arm 329 and the fork 29 are swung counter-clockwise so that the clutch is opened and is locked in open position by the bell crank 27.

The power train between the pinion 34 and the rack bar 49 is as follows:

The pinion 34 meshes with an idler 35 (Fig. 5) journaled on the rear wall 1, which idler in turn meshes with a gear 36 fast on a shaft 37 (Fig. 6). The shaft 37 extends rearward out of the frame 1, and at its outer end is journaled in a bearing of the gear housing 208 (Fig. 4a). Inside this housing the shaft carries a gear 38 which meshes with a gear 39 shown in section in Fig. 3. This gear is fast on a hub 209, which in turn is fast on a horizontal shaft 50 which is supported in the housing 208. The inner end of this shaft projects in front of the housing and lies in the cutout 317 of the rear wall of the frame, where it has fast thereon a pinion 48 which meshes with the rack bar 49 on the carriage.

Card feed

The drive for the picker 9 is derived from the return motion of the card carriage. The front bar 19 of the carriage (Figs. 7 and 8) has secured thereto a bearing block 53 to which is pivoted a dog 54 which normally hangs at the rightward and downward inclination shown in Fig. 7. The pivotal motion of the dog is limited by its finger 324. In the path described by the free end of this lever is a pin 57 which projects from the rear side of a bar 56. This bar is slotted and is guided on the inner side of the forward wall 1 for horizontal sliding on a stud 59 (Figs. 3 and 8). It is urged toward the left by a spring 62 fastened to the frame. Its right end is extended upward and is pivoted to a toothed rack bar 58 arranged to slide horizontally by slots on two crossbars 59' supported by the frame. The teeth of the rack are in continuous mesh with a gear wheel 60 fast on a shaft 16 journaled in the walls of the frame. The shaft 16 carries a crank arm 15 which by a pitman 14 is connected with a boss on the underside of the picker 9. The free end of the dog 54 has a right-angle extension in which is a follower roller 55 in the path of which lie the two inclined edges of a cam-like deflector 61 which is fixedly mounted on the inner side of the forward frame wall 1. When the carriage moves from the position shown in Fig. 7 toward the left, the roller 55 runs over the deflector 61 and in doing so is only momentarily raised thereby. The downward extension in which the roller 55 is journaled, is off-set rearward from the body of the dog so that, on the further leftward motion of the carriage it does not strike the stud 57. The body of the dog, however, rides over said stud and, at the end of its leftward motion drops behind it. By the return motion of the carriage the abrupt end of the lever 54 strikes the pin 57, but it cannot immediately run over it and it therefore carries the rack bar 58 along with it. The shaft 16 is thus turned clockwise and draws the picker 9 leftward. When this action is completed, the roller 55 will run up over the left inclined edge of the deflector 61 and will be raised so that the lever 54 will be withdrawn from the pin 57 and the slide 56 will be freed. The latter will be restored by the spring 62 to its normal position, and hereby also the picker 9 will be restored to its normal position.

As the carriage approaches its normal position the card which has been fed by the picker to the feed rolls 17, 18, is advanced by the latter until its leading edge moves under two upwardly inclined lips 325 with which the gripper 65 is provided, whereby said gripper is raised. After the card runs free of the rollers 17, 18, it moves a little further by momentum until it strikes the forward gripper 66, while the gripper 65 drops behind the rear edge of the card and the card is thus connected to partake of the key-controlled leftward travel of the carriage. As the carriage approaches the end of its travel leftward, an upwardly inclined lip 326 (Fig. 1) of the gripper 66 rides up on a bar 245 secured to the frame, whereby the gripper is raised to release the card, which, on the last step of the carriage will be caught by the feed rolls 51, 52. In this same step the carriage acts on the trip lever 24, as above described, and sets in motion the carriage return movement which, as will presently appear, is accompanied by rotation of the feed rolls 51, 52, which, while the carriage is returning, feed the card out from under the gripper 66 and to the receptacle.

It will be perceived from the above that it is necessary for the feed rolls to be actuated during the return motion of the carriage. For this purpose the power of the above described carriage return actuator is utilized. Preferably the feed rolls 17, 18 and 51 are positively driven while the rolls 52 are free and are driven only by friction.

The shape of the lower feed rolls 18 and 51 corresponds to that of the roll 17, Fig. 1. They each consist of a shaft lying transverse to the direction of card feed and having two integral circumferential ribs which engage the cards close to the longitudinal edges thereof. The shaft 18 (Fig. 16) is journaled in bearings 215 which are secured to the walls of the frame 1. The shafts of the two lower rollers extend through the rear bearings and on their projecting ends carry bevel gears 47, which mesh with bevel gears 46 (Figs. 4 and 4a) fast on a common shaft 45, which lies parallel to the rear wall 1 and is journaled in bearings 214 secured by screws to the rear wall. The shaft of the feed roll 18 carries near the bevel gear, a spur gear 327 (Fig. 16) which meshes with a spur gear 328 on the feed roller 17, so that this is also power driven. Near its middle the shaft 45 carries a third bevel gear 44, by which it derives its power from the gearing for the carriage return mechanism.

To this end, a horizontal shaft 212 (Fig. 3) has a bearing in the gear housing 208, and inside the housing carries a bevel gear 43 meshing with the gear 44, and a collar 213 to prevent endwise movement. The bevel gear 43, which meshes with the bevel gear 44, carries a spur gear 42, which meshes with a gear 41. This gear is secured by screws to a housing 211 which is freely rotatable on the shaft 50, and it has a flange which encircles clutch rollers 40 and a clutch disk 210 which is fast on a hub 209 which is fast on the shaft 50 (see also Fig. 18). The clutch rollers 40 cause the housing 211 to rotate with the shaft 50 when the latter is turned in the direction to restore the carriage, but permit the shaft to turn in the opposite direction without rotating the housing, so that the feed rollers are not rotated when the carriage is moving step by step leftward.

The shaft of the feed roll 17 (Fig. 16) is so journaled that it can yield upward when a card comes between the rollers 17 and 18, said shaft being drawn downward by suitable springs 217. To this end (Fig. 16) the shaft is journaled in a block 216 drawn downward by a spring 217 and having a vertical slot 337 by which it is guided on the shaft 18.

The two rollers 52 are not carried by a common shaft but each is journaled by ball bearings on a pin projecting from a separate lever 219 (Figs. 1 and 4a) pivoted at 218 to a bracket secured to the deck-plate 303 and overlying the bar 67, (Fig. 3). Springs 220 attached to the levers 219 draw the rollers into contact and enable them to yield independently of each other to the thickness of the card.

The step by step feed of the carriage

The travel of the carriage toward the left is produced in a way similar to that in typewriting machines, by the power of a spiral spring under the control of an escapement. The spring 204 is enclosed in a drum 207 mounted on the shaft 50 but not operatively connected with said shaft. The outer end of the spring extends out through a slit in the drum and is secured to a fixed pin (not shown) projecting from the housing 208. The inner end of the spring is secured to a bushing 206 fast on the shaft 50. It is wound up during the return motion of the carriage, and it tends to turn the shaft clockwise in Fig. 4a so as to propel the carriage leftward (toward the right in Fig. 4a) by means of the pinion 48 and rack 49.

The escapement for controlling the leftward travel of the carriage (Figs. 4a and 12) comprises an escapement wheel 112 fast on the bushing 206, and two feed dogs 110 and 111. These dogs are mounted on a rock shaft 109 journaled in the housing 208, the feed dog 110 being fast and the holding dog 111 loose on the shaft, the latter being normally drawn into engagement with the escapement wheel by a spring 175. The dog 111 has a stop arm 113 pressed by the spring 175 against a pin 114 on the dog 110, whereby when the dog 110 is moved into engagement with the wheel the dog 111 is forced out, but the latter can be swung out of engagement independently of the former, thus releasing the wheel and carriage. During the return motion of the carriage the dog 111 clicks over the teeth of the wheel 112. Whenever the shaft 109 is rocked clockwise (in Fig. 4a) by the key-controlled verifying mechanism as hereinafter explained, the nose of the dog 110 is rocked into the path of a tooth of the wheel 112, and the dog 111 is withdrawn, so that the escapement wheel makes a partial step until the wheel-tooth strikes the dog 110. On the release of the key, the spring 175 moves the dog 110 out of, and the dog 111 into engagement, so that the escapement wheel makes the remaining part of a full step.

Feeler pins

Figure 11:
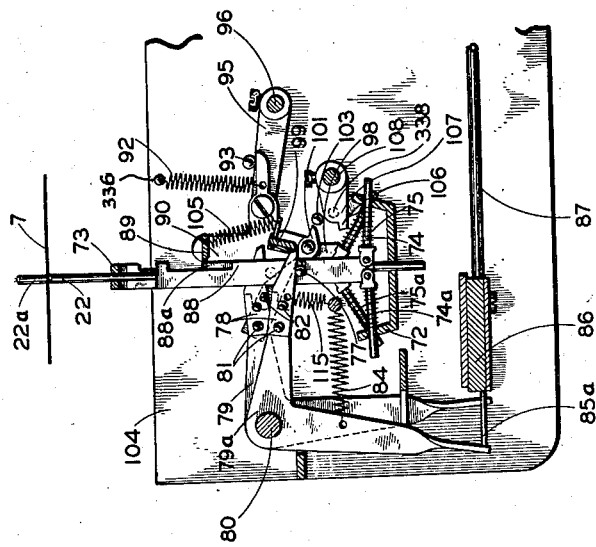
Figs. 10 and 11 are views like a portion of Fig. 2, showing the verifying mechanism in different positions, viz., Fig. 10 with a correct key depressed and Fig. 11 with a wrong key depressed or where a column contains two holes and only one key was depressed.

Each feeler pin 22 (Figs. 2, 3, 5, 10 and 11) consists of the reduced and rounded upper portion of a flat bar 330. These pins, of a number equal to the number of the index positions in a card column, are arranged in a front to rear row just beneath the bar 308 (Fig. 1). The pins 22 are guided by a frame bar 73 whose downward bent arms are secured to the frame plates 104. The pins 22, 330 have their lower ends also reduced and guided in holes in a bracket 72, somewhat U-shaped in cross section, lying parallel to the bail 73 and suitably secured to the side plates 104. The flat middle part of each pin between the guiding ends has a cut-out 331 (Figs. 10, 11) and is provided with a pin 77 projecting from both sides thereof. At its lower part each pin has the forked heads 332 of two small rods 74 pivoted thereto, said rods passing through and guided by holes in the upwardly directed flanges of the bracket 72 and pressed lengthwise by springs 75 compressed between the bracket and the heads of the pins. During the sensing operation, most of the feeler pins 22 rest against the under side of the card, in which position the rods 74 are slightly inclined, so that the springs 75 exert but a slight upward component of pressure on the bars 330 and the pins 22 are pressed but lightly against the card. Any marring of the card by the pressure of the pins is thus avoided. When, however, any pin finds a hole in the card, it passes upward through it, and the further up it moves, the greater becomes the upward inclination of the rods 74 and, therefore, the greater the effective upward component of the pressure of the springs 75. In Figs. 2 and 11 a pin designated 22a is shown projected upward through a card perforation.

Figure 10:
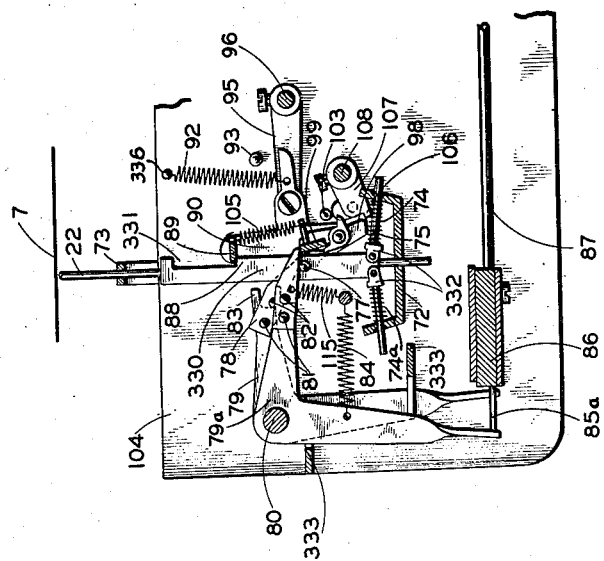

To the left of the feeler pins is a horizontal pivot rod 80 secured to the frame plates 104 and on which are freely pivoted a set of bellcranks 79. These point toward the bars 330 and are guided by two comb plates 333, secured to the frame plates 104. The downwardly directed arms of the bell cranks 79 are twisted through 90° and present their broad sides to needles 85a which are guided in a comb 86 and each of which can be slid leftward by a Bowden wire in a Bowden cable 87. An individual Bowden cable goes to each numbered key in the keyboard. When a key is depressed, the corresponding bell crank 79 is rocked clockwise against the tension of a spring 84. The rightwardly directed arm of each bell crank has a pin 81 projecting from both sides thereof, on whose ends are pivoted two plates which are united by a rivet 82 into a bifurcated head 78, the free end of which embraces the corresponding feeler pin 330. The cross rivet 82 may contact a finger-like extension 83 of the arm 79, as shown in Fig. 10. Normally the head 78 is drawn downward about its pivot 81 by a spring 115. It then rests on the pin 77 of the bar 330. In Fig. 2 the head 78 nearest the observer is in normal position. If a feeler pin passes through a hole in the card its pin 77 swings the head 78 upward to straighten the toggle 79, 78, as shown in the case of the second pin from the observer in Fig. 11. If now the operator depresses the corresponding key, the bell-crank 79 will be swung clockwise, and its finger 83 will force down the head 78, which will draw the elevated feeler down. In Figs. 10 and 11 this motion is shown at a point short of a full key depression. The lever 79 is rocked beyond the point there shown and until the toggle, consisting of the two rods 74, has passed its dead center and the springs 75 are therefore acting downward, which they do until the pin ends are arrested by the bracket 72. When the depressed key corresponds to the perforation, all of the other pins will also be moved down to this subnormal position by means to be described, and they will so remain until the key has about returned to normal and during the resulting step of the carriage. This is to avoid marring the card.

Beneath the feeler pins there lies a horizontal restoring bar 299 (Fig. 2) carried by two levers 116 pivoted at 117 to the frame plates 104. To the rightwardly directed arms of these levers are connected springs 119 anchored to pins 118 on the plates 104, while the leftwardly directed arms of the levers 116 carry the arms 120 of a bail 121, which lies beneath the horizontal arms of the bell cranks 79. The arms 120 are guided for longitudinal sliding on pins (not shown) projecting from the frame plates 104. As long as a key remains depressed, which occasions the stepping of the carriage and the withdrawal of the feeler pin, the operated bell crank 79 holds the bar 299 in its depressed position, which permits the feeler pin to remain so far depressed that its pins 74 and springs 75 are below their dead center position, so that the feeler pin does not begin to rise in the first part of the return motion of the lever 79. It is not until the said lever has returned substantially to normal position and the carriage has therefore made a part of its step, that the bar 299 raises the feeler pins above their dead center, so that they receive a slight upward component of the pressure of the springs 75 and are pressed lightly against the card. The danger of a pin re-entering the same hole from which it had just been withdrawn, is thus obviated.

The angle at which the spring 119 acts on the levers 116 is such that the deeper the bar 299 is depressed, the greater will be the leverage of the spring on the levers, and the greater its tendency to raise the bar. It is thus assured that the pins will be restored with certainty, without using too stiff restoring springs for the bar 299, and without the return of the pins upward against the card being made with such force as to injure the card.

When the card to be verified is being advanced to the carriage by the picker 9 and rollers 17, 18, the feeler pins must be drawn down so as not to obstruct the entry of the card into the carriage. Also, in case during the verifying operation it is desired to skip over one or more columns, the pins must be pulled down so as not to be caught in any perforations there may be in a skipped column. To this end (Figs. 2, 3 and 17) a bar 139 is provided, lying across the upper shoulders of the flat bars 330 at the right of the pins 22 and so disposed as normally to limit the upward motion of a pin and as that, by depressing said bar 139 all of the pins 22 will be pulled down out of the path of the card. At each end the bar 139 has a depending finger, said fingers pivoted to arms 138 fast on a rock shaft 137, journaled in the frame plates 104. Also the bar 139 has upwardly directed fingers 334 off-set leftward therefrom in Fig. 2 (rightward in Fig. 17) and lying to the left of the guide bar 73 so as to guide the bar 139 for vertical motion.

The shaft 137 has a third arm 136 between the arms 138 and pivoted to a link 129 which extends to the right (Fig. 2) and its slotted end is guided by a pin 130 projecting from an arm 132 fast on a horizontal shaft 133 journaled in the frame 1. A spring 134 urges the link toward the right (Fig. 2) and tends to hold the bar 139 in its upper or normal position. A pin 128 projecting from the link 129, lies in the path of an arm 206 fast on the rock shaft 16, so that when said shaft is rocked to feed a card from the magazine to the carriage, the bar 139 is pulled downward and pulls the pins 22 out of the path of the card. When the bar 139 is moved to its lower position a latch 140 (Figs. 3 and 17) pivoted to one of the vertical arms of the guide bail 73, snaps over the finger 334 of said bar and locks it down. The latch 140 is influenced by a spring 141. When a card is fed into place by the picker 9 and rolls 17, 18, the carriage is also returned to its right-hand position. At the last part of the return motion of the carriage, the cross bar 205 thereof strikes the latch 140 and releases it, permitting the bar 139 to be raised by the spring 134 and the feeler pins to move up into contact with the card. The machine is then ready to verify the card by working the keys.

*Verifying mechanism*

The verifying mechanism co-operates with the feeler pins and the bell cranks 79 in such a way that the carriage escapement is operated through the shaft 109 in case, and only in case, the key or keys depressed correspond completely with the perforation or perforations in the card column being checked at the time. The escapement will not be operated if any key is depressed which does not correspond to a perforation, and it will not be operated if there is a perforation and the corresponding key is not depressed. The stepping of the carriage makes a certain amount of noise which, if desired, may be accentuated by an acoustical device, so that the operator should observe the error at once. If he does, he may find that he had struck the wrong key, in which case he may then strike the right key and, if the card is correctly punched, the carriage will step and he may proceed. If the card was incorrectly punched he may remove it from the machine by means to be explained hereinafter.

The verifying mechanism, which is shown by itself in Figs. 9 and 9a, will now be described. A shaft 96, parallel to the row of feeler pins, is journaled in the frame plates 104 at the right of said pins, and it carries two parallel arms 95, on whose ends studs 91 are carried. On said studs are pivoted two side plates 90 which by a sensing bail bar 89 are united into a rigid frame, which can swing about the studs 91. A spring 92 anchored to a stud 336 on the rear frame plate 104 is connected to the rearwardly directed arm 94 of one of the plates 90, at a point between the pivot 91 and a fixed stop pin 93, and tending to draw the feeler frame 89, 90 together with the arms 95 of the shaft 96 upward until the arms 94 and 95 are both arrested by said pin as shown in Figs. 9 and 11. Between the side plates 90 there is pivoted a bail which comprises a shift bar 99 lying parallel to the bar 89 and carried by upright arms 97 pivoted on studs 100, riveted into the side plates 90. The bar 99 has a rightwardly directed pin to which is connected a spring 105, anchored to the bar 89 and tending to turn the bail 97, 99 counter-clockwise in Fig. 9. On one of the studs 100 is mounted a dog 101 having two arms. The upright arm of this dog is yieldingly pressed against the bar 99 by a spring 102 riveted to the latter; while the other, approximately horizontal arm, is adapted on the downward motion of the bar 89, to snap under a pin 103 projecting from the frame plate 104, and on the upward motion thereof to be caught by said pin 103 and so to cause a clockwise swinging of the bar 99 about the studs 100, until said arm escapes from said stud, whereupon the bar 99 will be swung back by its spring 105, to its normal relation to the plates 90.

The bar 89 is capable of swinging into the cut-outs 331 of the feeler pins 330, as shown in Fig. 10. In the normal position shown in Figs. 9 and 11, however, the arm 94 acts as a lever of the third order having its fulcrum on the pin 93; and the spring 92 has swung said arm clockwise so as to hold bar 89 out of said cut-outs. When the whole frame is moved down by a bell crank 79, 78 acting on the bar 99 causes the spring 92 to swing the bar 89 into said cut-outs as shown in Fig. 10.

In the normal position of the parts, in which the arms 94 and 95 rest against the pin 93, the bar 89 occupies the position shown in Figs. 9 and 11 with the bar 89 in its upper position and swung to the right where it is outside the cut-outs 331 and the bars 330. The points of the heads 78 are held by the springs 115 down at the left of the bar 99, as shown in full lines in Fig. 2.

The escapement shaft 109 is coupled to a shaft 108 journaled in the frame plates 104 and in such a way that the escapement is operated by rocking the shaft 108 counter-clockwise and back. To this end the shaft 108 carries an arm 107 (Figs. 10 and 11) having a laterally projecting pin 338 shown in dotted lines in Fig. 11 and which extends backwards through a slit in the frame plate 104 and is shown in Fig. 12 in section. When this pin moves downward it strikes an arm 339 fast on a shaft 340 journaled in the frame, and in turn carries a rearwardly directed pin 341 which, on the rocking of the arm 339 presses on an arm 342 which is fast on the escapement shaft 109. When the arm 107 of the shaft 108 is swung downward, the shaft 109 of the escapement is rocked counter-clockwise.

The arm 107 has also a nose 106. On the downward motion of the bar 89 a transmitting member 98, consisting of an extension of one of the arms 97, can act on this nose, as shown in Fig. 10, and thus operate the carriage escapement. This action can, however, be defeated by moving said member a little to the left of the nose 106 in Fig. 10, which can be done either by a clockwise swinging of the frame 89, 90 about the pivots 91, or by a clockwise swinging of the frame 97, 99 about the pivots 100.

It will be seen that in order for a stepping of the carriage to occur two conditions must be fulfilled simultaneously. First the bar 89 must move downward, and second the member 98 must not have been swung in clockwise direction.

If there is a hole in the sensed card column the corresponding feeler pin under the operation of its springs 75 will pass up through it and its pin 77 will swing the head 78 of the associated bell crank 79 upward about its pivot 81 and bring the latter into the position shown in the case of the more remote head 78 in Fig. 11. In this position the cross pin 82 of the head lies against the contact finger 83 of the bell crank and the point of the head lies over the bar 99 which has not prevented the raising of the head 78. The spring 115 is thus stretched but it is weaker than the springs 75. Also the shoulder 88a below the cut-out 331 of the elevated feeler pin has moved up adjacent the bar 89 which is in its normal position out of the path of said shoulder as shown in Fig. 2. All of these operations have been performed automatically without the necessity of any action by the operator. Let it be assumed that the carriage is in its right hand position so that the first card column is sensed, that in this column there is a perforation in position No. 1 as shown in Fig. 1, and that this column is correctly punched. Feeler pin No. 1 will have moved up into a hole and head 78 of the No. 1 bell crank 79 will have been straightened up and will be lying over the bar 99. The shoulder 88 of No. 1 pin 330 will have moved up behind the sensing bar 89, as shown at 88a in Fig. 11. The operator will now depress key No. 1, and the head 78 of the corresponding bell crank 79 will draw down the feeler pin and the bar 99, and with it the bar 89. The pin begins its movement before the bar 99, withdrawing the shoulder 88 out of the way of the sensing bar 89 which can therefore swing into the cut-outs 331 above the shoulders 88. This swinging movement of frame 89, 90, swings transmitting member 98 over nose 106. The left under edge of the bar 89 is somewhat beveled in order to facilitate its entry into the cut-outs 331. When the bar 89 has moved into the cut-outs 331 it receives no further swinging motion, but a sliding motion downward, by which the pivot pins 91 by swinging of the arms 95 are moved downward. Just before the end of the downward motion of the key the extension 98 strikes on the nose 106 of the lever 107, as shown in Fig. 10, and operates the carriage escapement as described above. The bar 89 during the key depression is moved so far downward that it carries the other normally positioned feeler pins down below their dead center positions as was explained under the preceding title.

When the key is released the depressed feeler pins, due to the passing of their dead centers, remain in their lower positions while the bar 89, under the operation of the spring 92, rises to its normal position. During this upward movement the bar 99, by the striking of the dog 101 on the fixed pin 103, will be momentarily swung clockwise, whereby the head 78 of the bell crank 79 which was operated by the key will escape from the bar 99 and be drawn down by its spring 115 and will drop to its normal position. The bar 89, by the striking of its arm 94 on the fixed pin 93, will be withdrawn from the cut-outs 331.

The two conditions for the operation of the escapement, first that the bar 99 be pressed down, and second that the bar 89 be swung counter-clockwise, are fulfilled by the depression of the key corresponding to the perforation in the card. After the release of the key all of the parts are restored to normal position and the escapement is operated so that now the second column is presented for sensing. Let it be assumed that this column has a perforation in position No. 5. It may be assumed that this column has been punched incorrectly and that position No. 3 should have been punched and the operator therefore depresses key No. 3. The head 78 of the No. 3 bell crank 79, however, is not in its extended position but has its point lying at the left of the bar 99. Therefore, on the swinging of this key-operated lever, whose horizontal arm and the head constitute a toggle, the head presses the bar 99 on its lower edge toward the right, as shown in Fig. 11, without moving it downward. The conditions according to which the escapement is operated are not fulfilled and the carriage stands still. On the return of the key and its bell-crank, the head 78 of the latter resumes its knuckle-joint position and the bar 99 resumes its position.

A similar operation occurs in case the sensed card is correctly punched but the wrong key is depressed. In this case the operator, observing his mistake, may depress the correct key and the carriage will advance and he may proceed with his work.

Let it now be assumed that in the column to be sensed a hole has been punched correctly, but in addition a second hole has erroneously been punched, and that the key is depressed corresponding to the correctly punched hole. In this case the head of the key-operated lever 79 would lie on top of the bar 99 and would depress said bar and the bar 89, and by the pin 77 would depress the corresponding feeler pin. The other feeler pin which had entered the erroneously punched hole, would remain, however, in its upper position and would prevent the bar 89 from swinging counter-clockwise into the cut-outs 331, so that the projection 98 would not strike the nose 106 and the escapement would not be operated. One of the two conditions on which the action of the escapement depends, would not be fulfilled.

When two holes occur in a column both keys corresponding thereto must be depressed in order to operate the carriage escapement. It will not be operated by depressing only one of the keys.

There remains the instance where two keys are simultaneously depressed but the column contains only one hole corresponding to one of the keys, whether this occurs because the card was incorrectly punched or because the operator operated two keys by mistake. In this case the depression of the key whose corresponding feeler pin has failed to find a hole in the card will cause the bar 99 to be swung to the right. It will thus be swung out of the path of the head of the lever 79 operated by the other key, so that the latter cannot depress the bar. The bar 89 will swing into the cut-outs 331, but the other condition will be unfulfilled, namely the depression of the bar 89. Even if the bar 99 should be moved down in this instance it would not work the escapement because the other key would swing said bar clockwise and the extension 98 would not strike the nose 106.

In case in any column no holes occur, the operation of a key would result only in swinging the bar 99 toward the right and the escapement would not be worked.

Space key

If the operator desires to skip a column, because it is not punched, he depresses a space key 300 (Fig. 1a) which, like the numeral keys, is connected by a Bowden cable with a bell crank 79 on the pivot shaft 80. The head 78 of this bell crank is, however, not pivoted but extends rigidly in its upper position, so that it stands always above the bar 99. When the space key is depressed, the bar 99 is moved downward, carrying with it the bar 89 which enters the cut-outs 331, and therefore draws all of the feeler pins down out of contact with the card. The extension 98 will be in working position and the escapement will be operated.

In case the column had erroneously been punched, so that one of the feeler pins was in elevated position, the bar 89 would not enter the cut-outs 331, the extension 98 would not be in working position and the escapement would not be operated.

It will be noted that in every instance of a key operation which does not correspond to the punching, the parts return to the same positions they occupied before the key operation.

Tabulator mechanism

In order that any columns may be skipped which do not need to be verified, a tabulator mechanism is provided. When the tabulator key 123 (Fig. 1) is depressed, the feed dogs of the escapement are released and the carriage jumps under the power of the spring 204 a distance determined by the adjustable tabulator stops 168 (Fig. 2).

The tabulator key 123, like all the other keys (see Fig. 13) is guided vertically in a hole in the keyboard plate 2 and has a returning spring 343. Its stem at its lower end carries a knob 344 by which it presses on the wire 345 of a Bowden cable, whose sheath is secured to the plate 2 by a cable holder 346. Unlike the other keys, however, the tabulator key has under its knob 344 a vertically sliding plunger 124, which in Fig. 2a in front of whose plane it lies, is represented by dotted lines. In the side walls 1 of the frame a shaft 126 is journaled, to whose arm 125 the plunger 124 is pivoted. Inside the frame said shaft has a second arm 127, which may contact with a pin 128 projecting from the bar 129. Said bar will thereby be moved toward the left, when the key is depressed, which, as hereinbefore explained, results in pulling down all of the feeler pins and locking them down by the latch 140 (Figs. 2 and 17). This latch also locks the link 129 in its left-hand position when the tabulator key is released and returned to its normal position.

The Bowden cable of the tabulator key 123 ends behind the frame wall 1 (Fig. 4a) in a cable-holder 142, which is secured to a stationary bracket 143. The wire 345T of this cable may press upward on an ear 145 bent off horizontally from a lever 144, which is freely pivoted on the escapement shaft 109, and whose free end is guided in a slotted branch of the bracket 143. The lever 144 carries a forwardly directed pin 146, which, by means of 147, engages a second lever 148 which lies adjacent the lever 144 and like it is pivoted on the shaft 109. When the lever 144 is moved upward by the Bowden cable, the lever 148 is carried with it. The lever 148 has a pin 149, whose underside is formed into a suitable stop surface, with which when the lever is lifted a hook 150 engages and locks said lever in its raised position. The hook 150 is part of a two-armed lever 151, which is pivoted to the rear wall 1 on a pivot screw 152. The lever 144 is also provided with a contact piece 153 adjustable lengthwise of the lever and secured in adjusted position by screws, its nose capable of pressing against the escapement dog 110 to swing the latter into engagement with the escapement wheel when the tabulator key is depressed.

Adjacent the lever 148, as shown in Fig. 4a in dotted lines, there is freely pivoted on the shaft 109 a two-armed lever 154, which is angularly adjustable relative to the lever 148 to which it is secured in adjusted position by a screw 347, and by whose rocking the holding dog 111 is moved out of engagement, said lever 154 acting on a screw 155 in the dog. The escapement wheel is thus freed to rotate when the lever 144 occupies its lower position and the lever 148 its upper position. The wheel will, however, again be locked when the carriage has moved a distance determined by a tabulator stop. To this end there is vertically slidably guided on the pin 149 a slotted bar 156, which is normally drawn down into contact with the pin 149 by a spring 174, but by operation of the tabulator key is raised against the tension of the spring with the lever 148, and remains in its upper position after the release of the key, because the pin 149 is held up by the hook 150.

The tabulator stops are mounted on a pivotally and slidably mounted frame. As shown in Figs. 3 and 4a, a bar 158 is mounted on the rear face of the rear frame bar 159 by two screws 157 passing through horizontal slots in the bar 158 so as to afford to said bar a short sliding motion endwise. Said bar 158 has end brackets 301 extending upwardly and rearwardly, and the upper end of the hook-lever 151 is caused by a spring 160 to press rightward (toward the left in the rear view, Fig. 4a) on the right-hand one of said brackets, maintaining the bar 158 normally in its right-hand position.

In the brackets 301 are journaled the round ends 162 of a square shaft 163 fast on each end of which is an arm 164, (Figs. 1, 2, 3 and 4a). The right-hand arm is extended rearward as shown in Fig. 1 and has the link 156 pivoted thereto at 165. Two parallel bars 166 and 167 extend from one arm 164 to the other. Tabulator stops 168 are pivoted on the round bar 166 and slidable along to adjusted positions. The bar 167 has comb slits into which the stops may be inserted as desired. Each slit corresponds to a card column and is designated by a numeral on the scale 169 secured to the bar 163. The plate 169 may support the heading cut from one of the cards and which may thus serve as a scale by which to set the tabulator stops.

As explained above, the bar 156 is moved upward by the depression of the tabulator key and is locked in its upper position. This results in moving upward the rearward extension of the arm 164 and rocking the bar 163 counter-clockwise in Fig. 3, so that the adjusted tabulator stops 168 are swung down into the path of a nose 173 on the rear block 64 of the carriage. On the depression of the tabulator key, as above explained, the dog 111 is withdrawn from the escapement wheel, but at the same time the dog 110 is moved by the contact piece 153 into engagement, so that the carriage can make only a partial step. It is only on the upstroke of the tabulator key and after the feeler pins 22 have been pulled down and locked by the dog 140 that the lever 144 returns to its lower position and releases the dog 110, while the lever 148 remains locked in its upper position, and the dog 111 in its withdrawn position. The carriage is thus released by the up-stroke of the key and moves leftward until its nose 173 strikes the next tabulator stop 168. By this impact the frame comprising the bars 158, 163, 166 and 167 (Fig. 3) will be slid leftward (toward the right as viewed in Fig. 4). The arm or bracket 301, shown at the left in Fig. 4a moves the upper arm of the lever 151 and releases its hook 150 so that the lever 148 is moved downward by its spring 174 and the dog 111 is permitted to swing into engagement with the escapement wheel, whereby the carriage is held in position. By the unlatching of the hook 150, the bar 156 is also freed and the frame comprising the bars 163, 166 and 167, is swung upward by the spring 174 and lifts the tabulator stops out of the path of the nose 173.

The leftward motion of the frame 163, 164, etc., also releases the feeler pins by the unlatching of the dog 140. To this end, on the under side of the rear deck plate 303 a bar 200 is mounted by guide studs 199, as shown by dotted lines in Fig. 1. Its left end is offset and directed upward through the slot 307 into the path of a projection 348 of the arm 164 of the square shaft 163. The bar 200 is pivoted to a two-armed lever 195 (Fig. 17) which is pivoted on a stud 201 on the deck-plate 303, and whose free end strikes the latch 140 when the bar 200 is slid leftward with the tabulator frame. When the latch 140 is unlatched, the bar 130 is moved upward to its normal position by the spring 134 and frees the feeler pins for further verifying operations.

*Error lever*

In the description of the verifying mechanism, it has been explained that the carriage will not feed when an incorrectly punched column is encountered, and it was stated that in that case the error lever must be actuated to eject the card from the machine.

The error lever 4 (Figs. 1a and 13) is pivoted at the side of the keyboard in a bearing block 176 on a horizontal pivot, so that one may press it down by the palm of the hand. In the bearing block there is also journaled a shaft 133, which, as shown in Fig. 1a, extends back into the machine frame and carries the hereinbefore described arm 132. By an arm 178 and a pin 179, the shaft 133 is so connected with the lower arm 177 of the error key 4, that it will be rocked counter-clockwise by the operation of said key. Two abutments 180 limit the rocking motion of the key 4.

Adjacent the arm 132 and immediately behind it, the shaft 133 carries another arm 132a to which is connected a link 181, which in Fig. 2 is partially hidden by the link 129, and is controlled by a spring 134a occupying a position behind the spring 134. The function of the link 129, as explained under the title "Feeler Pins" is to pull down the feeler pins 22, which it does at each operation of the error key by means of the plate 139.

The link 181 has a pin 182, which is engageable by a pawl or latch 183 which is pivoted on a pin 184 projecting horizontally from the frame, and is influenced by a spring 193. Said pawl has a pin 185, which lies behind the arm 69a. When the link 181 is moved leftward by the operation of the error key, it will be locked by the pawl 183, and it will be released at the end of the carriage return movement by the abutment 68 on the carriage striking the arm 69a.

The link 181, which, as shown in Fig. 3, is between the frame plate 104 and the rear wall 1 of the frame, carries also at its middle part a pin 349 (Fig. 12) which engages in a slit in an arm 202, which is freely pivoted on the escapement shaft 109 and in its turn carries a pin 203, which passes through the cut-out 317 of the rear frame wall and lies behind the finger 113 of the holding dog 111 and is capable of releasing the latter without moving the dog 110 into engagement. The carriage will, therefore, be released by the operation of the error key and be run by its spring 204 to the end of its travel, when it will trip the lever 24 with the results hereinbefore described. Said lever causes the clutch 32, 33 to be thrown in whereupon the feed rolls 51, 52 are set into motion and eject the card, the carriage is returned to the right and a new card fed into it.

The bar 181 is pivoted to the arm 186 (Fig. 2), which is fast on the shutter shaft 188, so that the shutter tongue 187 is at once, upon the operation of the error key, swung downward. The card, therefore, moves onto the upper plate 189 on which the faulty cards are assembled.

When the carriage reaches its initial right-hand position, its left cross bar 205 strikes the projection from the latch 140 (Fig. 17), unlatches it so that the feeler pins are freed, they having been locked by the operation of the error key. Also, the bar 205 releases the pawl 183 (Fig. 2) as above described so that the bar 181 and the shutter 187 may be restored by the spring 134a to normal position.

Marking mechanism

The column in which an error is discovered, is marked, so that, when going over the cards stacked on the plate 189, one may know where the error occurred. The mark could be printed. Preferably, however, the faulty column will be marked by a cutout in the card, for example, by a notch in the upper edge of the card. The shape of this notch may be different in different machines so as to show on what machine the card was verified. One machine may cut a cross, another a triangle, another a square, etc.

The marking device is operated by the error key, and specifically by the bar 181, which, as explained, is moved leftward by pressure on the error key. The bar 181 carries on its forward side a pin 224 (Figs. 3, 14 and 15), which engages in a slot in a bell-crank 226, pivoted on a stud 225 on the frame plate 104. The horizontal arm of said bell-crank is off-set so as to become engaged by the hook-shaped end 228 of a link 227 pivoted at 236 to a lever 235. The link 227 carries at its lower end a roller 229, which, when the link is drawn downward, rolls on the inclined edge of a finger 231 secured to the frame plate 104, with the result that the link is cammed toward the front of the machine until it is released from the horizontal arm of the bell crank and is returned immediately to its normal position by a spring 233 attached to a pin 234, projecting from the link. The lever 235 is pivoted on a stud 237, projecting from a bracket 239 secured to the underside of the deck plate 303. The forwardly extending shorter arm of this lever is forked to embrace a pin 238 in the forked head of a punch 241, which is guided in a sleeve in the bracket 239, said punch being situated in line with the feelers 22, as shown at 240 in Fig. 1. The sleeve at the level of the card is made with a slot 242, through which the edge of the card passes, or into which it projects so that the edge of the card will be notched when the punch is operated. The construction is such that, during the leftward motion of the bar 181 on the positive stroke of the error key, the punch is forced upward through the card, the hook 228 is cammed loose from the lever 226 and the spring 233 withdraws the punch immediately, so that the punch does not interfere with the subsequent feeding of the card. When the bar 181 returns to its normal position, the bell crank 226 also returns, and the hook 228 again snaps in under it ready for another operation.

In order that the punch may be put out of operation, if desired, the spring 233 is anchored at its upper end to an arm 232, secured to an upright pin 243, loosely mounted in the deck plate 303 and having above said plate a knurled head 244 by which the pin can be turned. By turning this knurled head, the upper end of the spring can be swung to the left in Fig. 14, where its tension will be to the left of the pivotal center 236 of the link 227. The tension of the spring will then throw the said link leftward until it rests against the plate 104 and its hook 228 is out of the path of the bell crank 226. In this position of the parts the punch will not be operated even if the error key is operated. When the spring 233 is in its operative position, its line of tension is to the right of the pivot 236 and it assists in causing the hook 228 to engage the lever 226. The underside of the knurled head 244 may have a downward projection engaging two cut-outs in the deck plate 303, so that the tension of the spring will serve yieldingly to retain the parts in their operative and inoperative positions. The parts are so timed that the punch is operated and released before the carriage escapement is released.

Various changes may be made in the details of construction and arrangement without departing from the invention.

What we claim as new and desire to secure by Letters Patent, is:

1. In a machine for use with perforated cards, the combination of a feeler pin for sensing a perforation in a card, and means comprising a spring acting on said pin at such an inclination that a component only of its force is directed to move the pin into contact with the card and such that, when the pin enters a perforation the spring swings in a direction to increase the effective component of its force as the pin advances into the perforation.

2. In a machine for use with perforated cards, the combination of a feeler pin for sensing a perforation in a card, means comprising a spring acting on said pin at such an inclination that a component only of its force is directed to move the pin into contact with the card and such that, when the pin enters a perforation, the spring swings in a direction to increase the effective component of its force as the pin advances into the perforation, means for withdrawing the pin temporarily past the dead center of the spring so that the spring then tends to hold the pin away from the card, and means for then imparting a relative feeding movement to the pin and card.

3. In a card verifying machine, the combination of a set of feelers each capable of entering a hole in a card, keys, key-operated devices one for each feeler and each comprising a knuckle joint one member of which cooperates with its feeler, said feeler on entering a hole changing the position of said member, a universal bar movable in two directions from normal position, said member normally engaging one side of said universal bar so that a key-actuation will move said bar in one direction and said member when moved by said feeler engaging another side of said universal bar so that then a key-actuation will move said universal bar in the other direction, and means for apprising the operator of the machine in case said universal bar moves in the first mentioned direction.

4. The combination of a set of feelers for sensing a card, a spring-driven carriage for bringing the columns of such card one after another into register with said feelers, an escapement for said carriage, a tabulator key, tabulator stops, means whereby said key on its down stroke sets a tabulator stop in operative position, means actuated on the down stroke of said key to withdraw said feelers from the card and to retain them in withdrawn position, means acting to release said escapement on the up-stroke of the key, and means controlled by the arrest of the carriage for restoring said stop, said escapement and said feelers.

5. In a machine of the class described, the combination of sensing elements for a statistical card, a spring-driven carriage, an escapement for said carriage comprising an escapement rack and a normally engaged dog, a tabulator key, two parts 144 and 148 moved by the down stroke of said key, means for locking the part 148 in moved position, the part 144 returning to normal position on the up-stroke of the key, means operated by said part 148 for setting a tabulator stop in active position, means operated by said part 148 for moving said normally engaged dog out of engagement with said rack, means operated by said part 144 for holding said rack, means associated with said carriage for releasing said part 148, and means for returning said tabulator stop, normally engaged dog and part 148 to their normal positions upon the release of said part 148.

WILLIAM KUHLMAN.
PAUL BECKER.